Dec. 9, 1952

R. D. KELL 2,621,245

COLOR SCANNING SYSTEM

Filed Sept. 9, 1947

2 SHEETS—SHEET 1

INVENTOR.
Ray D. Kell
BY Samuel B. Smith
ATTORNEY

INVENTOR.
Ray D. Kell
BY Samuel B. Smith
ATTORNEY

Patented Dec. 9, 1952

2,621,245

UNITED STATES PATENT OFFICE 2,621,245

COLOR SCANNING SYSTEM

Ray D. Kell, Princeton, N. J., assignor to Radio Corporation of America, a corporation of Delaware Application September 9, 1947, Serial No. 772,978

13 Claims. (Cl. 178—5.4)

This invention relates to scanning raster position control, and more particularly to the registration of a plurality of superimposed scanning rasters, such as employed in the reproduction of color images.

The transmission of images of finite detail and discontinuous or limited motion by electricity has best been solved by the process of scanning, which consists of moving an exploring element or spot over the image to be transmitted in a periodically repeated path covering the total image area. The exploring element generates a signal which indicates the brightness of the image area at the instantaneous position of the exploring element. This signal is transmitted over the communication channel to the reproducing spot, whose brightness is controlled by the signal and whose movement is in synchronism with the exploring element at the transmitting station.

It will be seen that the accuracy of image reproduction is not only dependent upon the spot size and the detail of the scanning raster, but is also dependent upon the accuracy of registration or similarity of the scanning raster of the transmitter and the receiver.

Although great advances have been made in the production of accurate scanning rasters, very often lack of detail can be attributed directly to lack of registration, and this is patricularly true in the reproduction of images in substantially their natural color by the super-positioning process of separate selected component color images.

According to this invention, an auxiliary arrangement is provided whereby in one form of the invention each successive scanning raster is accurately super-positioned, and in another form of the invention, each line of the scanning raster is positioned at the same place with each successive scanning frame. In still another form of this invention, separate scanning rasters may be optically registered to provide proper super-positioning of different selected component color images or the reproduction of an image in substantially its natural color.

According to this invention, the scanning target has a control element or area having a selected edge extending along a desired scanning line. Circuit arrangements are connected in such a manner to derive from said control element an electrical indication of the relative position of the point of scansion with respect to the selected edge of the control element. The circuit arrangements then provide a raster positioning device such as, for example, an auxiliary centering coil with energy dependent upon the electrical indication to control the position of the scanning raster with respect to the selected edge of the control element.

A primary object of this invention is to provide for improved control of scanning raster position.

Another object of this invention is to provide for the generation of a more accurate scanning raster.

Still another object of this invention is to accurately register all of a plurality of scanning rasters.

A further object of this invention is to provide for an improved television system adapted for the reproduction of images in substantially their natural color.

Other and incidental objects of the invention will be apparent to those skilled in the art from a reading of the following specification and an inspection of the accompanying drawing in which Figure 1 shows by block diagram one form of this invention involving a single image pickup tube with interlaced scanning;

Figures 1, 2, 3, 4:
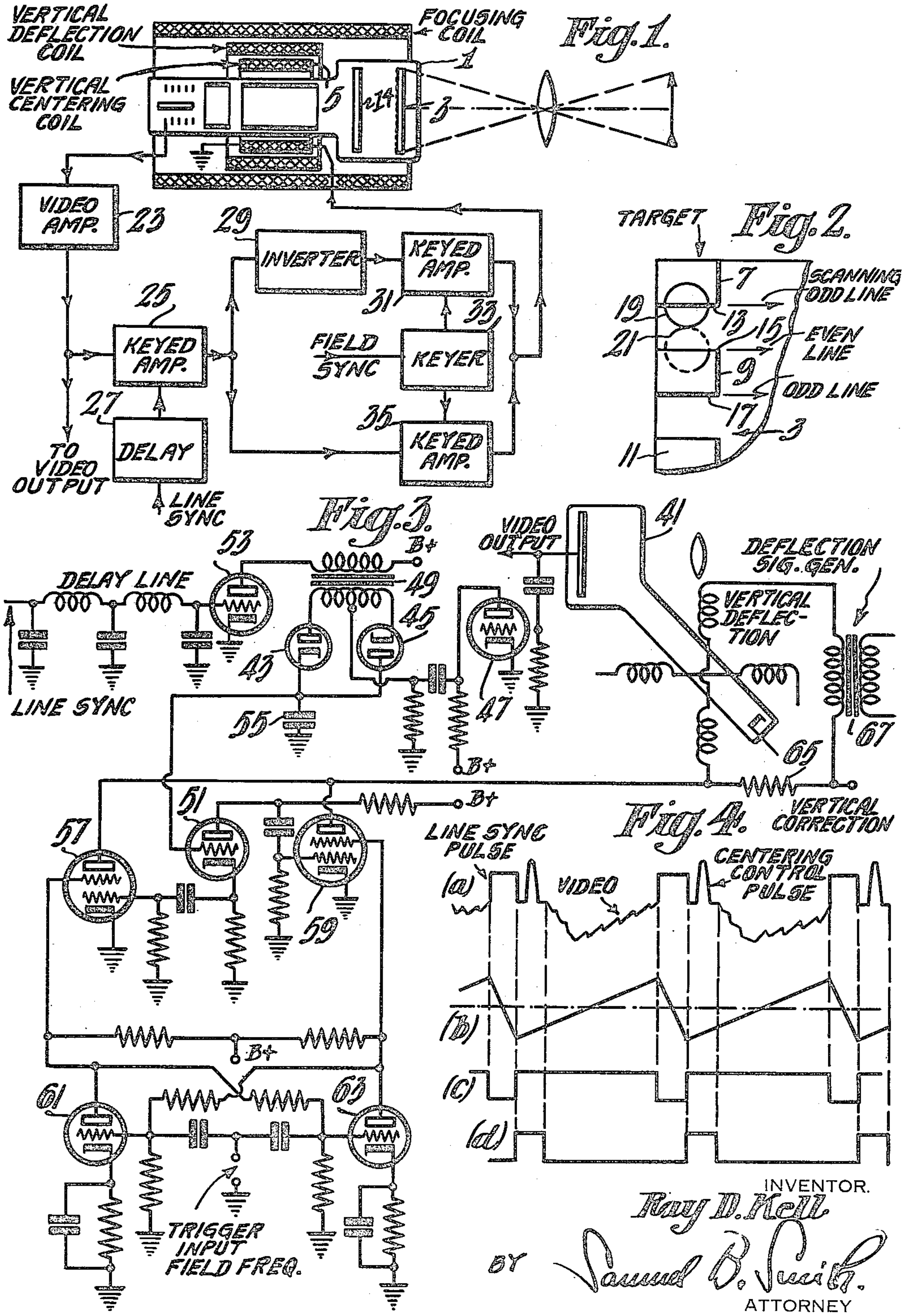
Figure 2 shows in detail an enlarged view of the control element structure and its position on a scanning target.
Figure 3 shows in detail by circuit diagram one form of this invention.
Figure 4 illustrates graphically the operation of one form of this invention.

Referring now in more detail to Figure 1, there is shown an image pickup tube 1 of the image orthicon type. The image orthicon 1 is illustrated by way of example, and except for the image area or target electrode 3 and the vertical centering coil 5, the tube may be of the popular type shown and described in the article entitled "The image orthicon, a sensitive television pickup tube" by Albert Rose, P. K. Weimer, and H. B. Law, published in the "Proceedings of the Institute of Radio Engineers" for July 1946. The image orthicon as employed in the television camera is described in an article entitled "Image orthicon camera" by R. D. Kell and G. C. Sziklai, published in the "RCA Review" for March 1946.

In the practice of this invention, the image orthicon 1 contains a special image area or image plate 3, as illustrated by enlarged section in Figure 2.

The structure and function of television transmitting tube image areas are quite well described in detail in textbooks on the subject of television, for example, the book entitled "Television" by V. K. Zworykin and G. A. Morton, published in New York by John Wiley & Sons, Inc., in 1940, and the book by Donald G. Fink entitled "Principles of Television Engineering," published in 1940 by McGraw Hill Book Co. of New York. It is believed sufficient for the purpose of explanation of the operation of this invention to indicate a section of the image area as in Figure 2 having control or elemental areas 7, 9 and 11 spaced along one edge of the target, such as, for example, the left-hand edge, in such a manner that a selected edge 13 of the element 7 extends along a line of the odd scanning line of an interlaced raster.

It is important to remember, however, that, for tubes employing the image section, the electron beam does not scan the electrode upon which is focused the optical image, but scans an electronic image; therefore, in some forms of this invention the beam does not scan the control elements, but, instead, a representation thereof. For example, in the case of the image orthicon 1, the scanning beam traverses the member 14, while the control elements 7, 9 and 11 are on member 3.

Although this invention is equally applicable to various forms of scanning rasters, the popularity of the interlaced scanning raster has caused it to be generally accepted for the reproduction of television images, and for the purpose of explanation of the operation of this invention, the interlaced type of scanning raster will be employed.

In the interlaced method of scanning, the odd numbered lines (first, third, fifth, seventh, etc.) are scanned first, the even numbered lines being omitted. Consequently, after one-half the lines have been scanned, the end of the first "field" or set of alternate lines is reached. The scanning process then begins again, and the even numbered lines (second, fourth, sixth, etc.) are scanned. These even numbered lines fall into the spaces between the odd numbered lines previously scanned.

Considering Figure 2 in connection with Figure 1, we find, in Figure 2, that the selected edge 13 of the element 7 is positioned along the odd scanning line, while the selected edge 15 of element 9 is positioned along the even scanning line. Likewise, a selected edge 17 of element 9 is positioned along the odd scanning line. This is repeated for each of the scanning lines. The scanning element is shown at the beginning of the odd scanning line as solid circle 19, while the scanning element is shown at the beginning of the even scanning line by dotted circle 21.

It will be seen that if some sort of control arrangement is provided in such a manner as to adjust the starting point of each scanning line on the lines 13, 15, 17, etc., as indicated in the target shown in Figure 2, the position of the scanning element throughout the line may be maintained correctly to form a substantially perfect scanning raster.

In one form of the invention, the elements 7, 9 and 11 take the form of the target structure, but consist of areas of reduced sensitivity. Reduced sensitivity permits the formation of an electrical indication dependent upon the position of the scanning element 19 with respect to the control element 7. If, for example, the illumination of the target in the vicinity of all the control elements and the spaces between the control elements are of uniform value, a scanning element 19 positioned totally in the control element 7 would give less signal indication than if the total area of the scanning element 19 were positioned between the control elements 7 and 9. It is therefore necessary that during the time interval occupied by even line scanning, the control energy be inverted in phase in such a manner that the auxiliary force applied for the correction of the position of the scanning element during even line scanning will be 180° out of phase with the force employed for the same electrical indication during odd line scanning.

It is also necessary that the control energy be obtained only during that portion of the scanning operation when the scanning element is in cooperation with the target at the position of the control elements.

Returning now to Figure 1, the operation of the invention may best be explained by reference to the block diagram wherein video amplifier 23 amplifies the video signal output of the pickup tube 1, which includes not only the image detail information but the control signal energy which is selected by keyed amplifier 25, which is made sensitive only during the time interval occupied by the control signal energy. The timing of the keyed amplifier 25 is so accomplished by passing the line sync or line blanking signal through an appropriate delay network 27. The necessary delay of the line synchronizing pulse or line blanking signal may also be obtained by employing a keyer in the form of a multivibrator circuit which is keyed on for a very brief interval by the trailing edge of the sync pulse or blanking signal. The delay network 27 or keying circuit is adjusted in such a manner as to delay the line synchronizing pulse or line blanking signal by a sufficient amount to cause keyed amplifier 25 to operate only during a brief interval immediately following the line synchronizing signal. This brief interval will correspond to the time at which the scanning element is at the position of the control elements on the image plate 3. The keyed amplifier 25 will be keyed only at the beginning of each of the scanning lines over the whole target area.

The output signal from the keyed amplifier 25 is transmitted through two channels. The upper channel includes a signal inverter 29 which may, for example, consist of a simple thermionic device whose output signal is 180° out of phase with its input signal, and a keyed amplifier 31 which may take the form of a thermionic tube having a plurality of control electrodes, one control electrode of which is excited with the signal obtained from the inverter 29 and the other control electrode which is excited by the keyer 33 which may take the form of an Eccles-Jordan circuit synchronized with the field synchronizing signal. The signal from the keyed amplifier 25 is also transmitted through a channel having keyed amplifier 35, which obtains a control signal from keyer 33, which causes it to be operable only during even lines, while keyed amplifier 31 is caused to be operable only during odd scanning lines.

The output signals from both the keyed amplifiers 31 and 35 are combined and transmitted to vertical centering coil 5.

The operation of the invention in the form shown in Figure 1 may be further explained by a reference to its operation in connection with the spot positions indicated in Figure 2.

If, for example, at the start of the odd line scanning the position of the scanning element 19 is too high, or in other words, too far in the area of the control element 7, the control signal transmitted through the video amplifier 23 will be lower than a predetermined value. The delayed line synchronizing pulse will cause keyed amplifier 25 to transmit this signal pulse to inverter 29, where the control signal will appear larger than a predetermined amount. Keyer 33 will cause keyed amplifier 31 to become operative, and an increased current will flow in vertical centering coil 5 to cause the scanning element 19 to drop in position such that its center line will correspond with the selected edge 13 of the control element 7 which has for its reference the predetermined control signal level referred to. Likewise, if the scanning spot 19 is too low with respect to the selected edge 13, the control signal energy transmitted through the video amplifier 23, keyed amplifier 25, inverter 29 and keyed amplifier 31 will provide less energy for the vertical centering coil 5.

The operation in the case of the even line scanning is similar to that of the odd line scanning, except that the keyer 33 synchronized by the field synchronizing pulse causes keyed amplifier 31 to be inoperative and keyed amplifier 35 to become operative. In the case where scanning element 21 is too high, causing a control signal pulse above a predetermined value or above the value established when the scanning element 21 coincides with the selected edge 15, an increased amount of energy through vertical centering coil 5 causes the scanning element 21 to drop in position to coincide with the selected edge 15. In a like manner, when the scanning element 21 is too low, it falls too far within the control element 9. The control signal is then lower than required, and the signal energy through the vertical centering coil 5 is lowered to allow the control element 21 to raise to its desired level.

Circuit arrangements are so chosen that the energy flowing through the vertical deflection coil will be maintained throughout the time interval occupied by a single line of scanning so that the scanning element will maintain its position throughout each scanning line. This can be accomplished, for example, in a well known manner by proper selection of capacity resistance combinations.

Additional detail regarding the operation of this invention may be had by reference to Figure 3. Image pickup tube 41, illustrated in the form of the popular iconoscope, is provided with an image area having a detailed structure as shown and described under Figure 2 above.

A portion of the video signal output of tube 41 is transferred to diodes 43 and 45 through amplifier 47.

Diodes 43 and 45 are combined with transformer 49 in what is commonly known as a D. C. setter circuit. The D. C. setter circuit involving diodes 43 and 45 establishes a bias to amplifying tube 51. It is necessary for the proper operation of this invention, however, that the bias of tube 51 be set by a control signal taken from the video of tube 41 only at a predetermined time during which the scanning element is at the position of the control elements on the target of tube 41. Such timing is accomplished by utilizing the line synchronizing pulse delayed through a delay line, as illustrated, and controlling tube 53, which causes tube 51 to become operative only during the proper time interval. It therefore follows that tube 51 will contain a proper control signal which will be maintained throughout the scanning line time interval by storage capacity 55.

The separate signal channels employed in the form of the invention shown in Figure 3 take the form of tubes 57 and 59. Tube 57 receives its control signal from the cathode of tube 51, while tube 59 obtains its signal from the anode of tube 51. It will be seen, therefore, that the signals obtained from tubes 57 and 59 are 180° out of phase.

It is therefore necessary to designate one of the tubes 57 or 59 for even line scanning and the other for odd line scanning. This is accomplished, for example, by the use of an Eccles-Jordan circuit, as illustrated, involving tubes 61 and 63. A detailed description of the operation of the Eccles-Jordan circuit may be found in any of the popular textbooks, such as, for example, the book entitled "Ultra High Frequency Techniques" by Brainerd, Koehler, Reich and Woodruff, published by D. Van Nostrand Co., Inc., in 1942 (pages 171–176).

By applying a trigger signal input at field frequency to the Eccles-Jordan circuit, tubes 61 and 63 will alternately pass current at field frequency in such a manner as to bias the auxiliary control electrodes of tubes 57 and 59 at field frequency. This causes one of tubes 57 or 59 to be operative during odd line scanning, while the other of tubes 57 and 59 is operable only during even line scanning. By connecting the output circuits of tubes 57 and 59 together and supplying plate voltage through resistor 65, which is serially connected in the vertical deflection circuit, a vertical correction of deflection may be obtained. The correction of vertical deflection results from a control signal voltage drop across resistor 65, causing a correction current to flow through the vertical deflection coils. The deflection signal is obtained through deflection transformer 67 connected in any of the well known deflection cuits, such as, for example, shown and described in the U. S. patent to W. A. Tolson, No. 2,101,529, dated December 7, 1937.

Figures 5, 6:
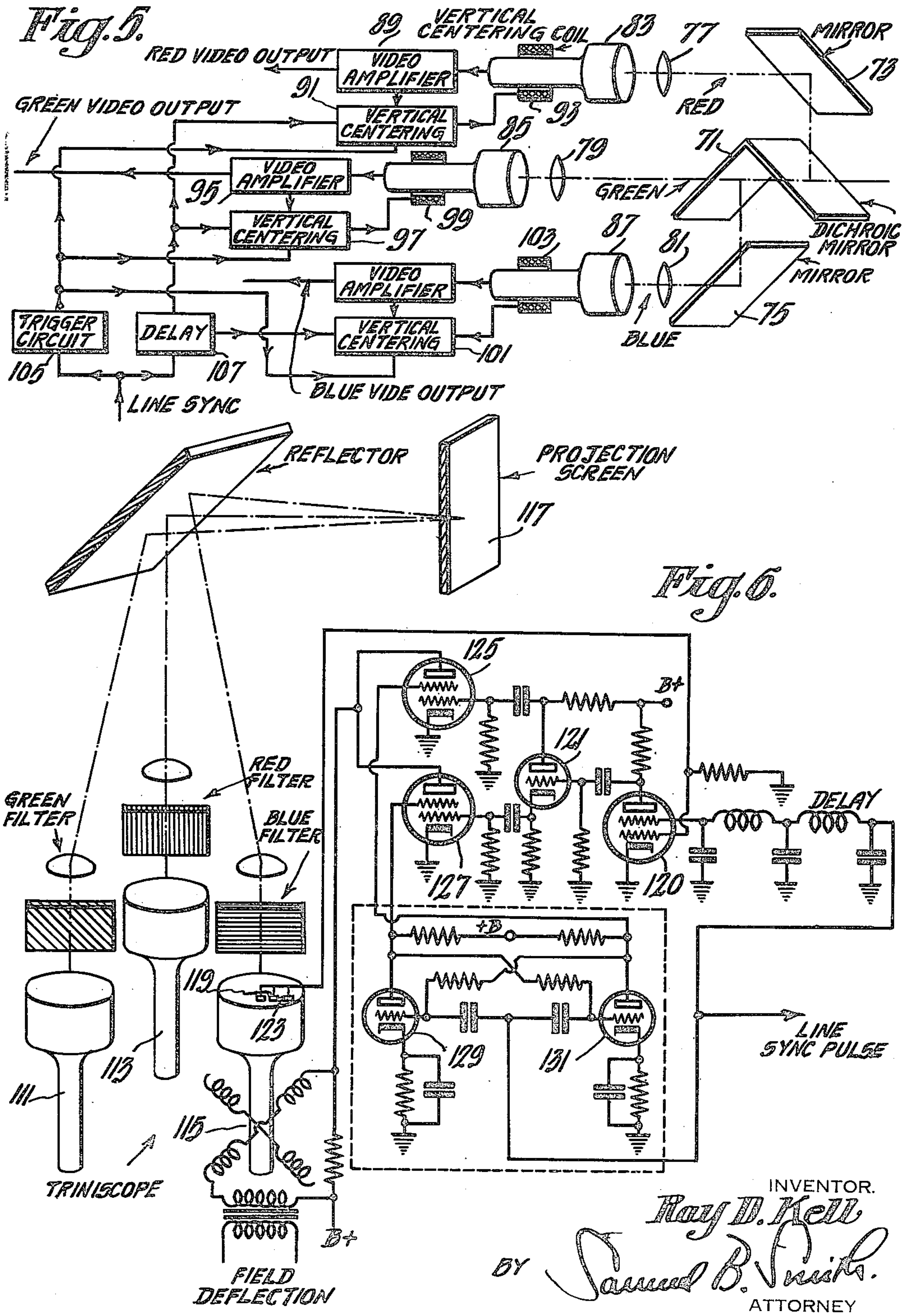
Figure 5 illustrates by block diagram the application of this invention in one of its forms to a camera arrangement employed for the transmission of images in their natural color.
Figure 6 illustrates the application of this invention by circuit diagram to the reproduction of images in their natural color.

Figure 5 illustrates graphically the operation of one form of this invention. Curve *a* shows in combination a video signal together with associated synchronizing pulse and centering control pulse utilized for vertical deflection correction. The timing of the centering control pulse is accomplished, as has been described above, by delaying the line synchronizing pulse an amount which is illustrated in curves *c* and *d*. Curve *b* illustrates the deflection energy curve.

The height of the centering control pulse in curve *a* governs the amount of energy transmitted to the vertical correction arrangement which may, as illustrated, take the form of a vertical centering coil illustrated in Figure 3. Additional systems for providing correction may be had by applying the correction voltage to the deflection coil directly, or applying the correction signal to the deflection signal generator in order to properly shape the sawtooth wave generated therein.

In Figure 5, there is illustrated a form of this invention involving the conversion of a natural color image into, for example, three different video signals representative of red, blue and green selected component colors.

Light from the colored image at the right intersects dichroic mirror 71 and is divided into selected component colors, as indicated. Although the dichroic mirror is illustrated as being preferable, the system is operable when using partially silvered mirrors and appropriate color filters for dividing the light into selected component colors. An improved dichroic mirror suitable for employment in this invention is shown and described in detail in the co-pending application of Alfred C. Schroeder, Serial No. 731,647, filed February 28, 1947, and entitled "Component Color Separator."

Mirrors 73 and 75 are employed to reflect the selected light through lenses 77, 79 and 81 to image pickup tubes 83, 85 and 87.

Each of image pickup tubes 83, 85 and 87 may be of any of the well-known types, such as the image orthicon, the orthicon, the image iconoscope, the iconoscope, or any other suitable devices for converting light energy into electrical energy in a regular order of scanning, providing, of course, that it contains an image area of the type described above and illustrated by an enlarged section of Figure 2.

The output signal energy of the transmitter tube 83 is amplified in video amplifier 89. A portion of this video signal, including the deflection control signal referred to above, is utilized through vertical centering device 91 to control the vertical deflection through the vertical centering coil 92. The vertical centering device 91 takes the form of the arrangement shown in detail in the circuit diagram illustrated and described in Figure 3.

Likewise, the output signal of image pickup tube 85 is transmitted through video amplifier 95. A portion of the video signal of tube 85 is then returned through vertical centering element 97 to vertical centering coil 99 of tube 85. Vertical centering device 101 provides the necessary control signal energy to vertical centering coil 103 of tube 87.

It will be seen from the block diagram shown in Figure 5 that trigger circuit 105 may provide the necessary switching voltage for all three image pickup tubes 83, 85 and 87. Likewise, the same delay circuit 107 may provide the necessary delayed keying pulse obtained from the line synchronizing signal to excite each vertical centering device. For purposes of simplicity, deflection coils and focusing coils are not illustrated in connection with tubes 83, 85 and 87, but may be of the conventional type and may be excited by a single auxiliary deflection system.

Turning now to Figure 6, there is illustrated a form of this invention which is applicable to the television receiving system.

Three image producing tubes 111, 113 and 115 are utilized with appropriate color filters to project a modulated scanning raster on the projection screen 117 in such a manner that all of the rasters from tubes 111, 113 and 115 follow in substantial registry on projection screen 117.

As has been referred to above, it is often difficult to provide for accurate registry of the scanning rasters, and in accordance with this invention, a registering device is provided.

The control elements are positioned on each kinescope screen, as illustrated in the enlarged section of Figure 2. In the case of the receiving tube, the control elements 119 are conductive and are connected to an amplifier tube 120. It will be seen that the amount of energy transferred from control elements 119 to the amplifying tube 120 is controlled by the amount of overlap of the scanning element 123 on the control element 119. If the scanning element 123 falls more than a predetermined amount in the area of control element 119, a greater amount of signal energy is transmitted to amplifier tube 120.

A brief reference to the principal of secondary emission will explain such a change in energy. If, for example, the control elements are of carbon or other highly secondary emissive substance, the more of the control element 119 covered by the beam, the more secondary emission, and therefore the charge on the control elements 119 will change depending on how much overlap there is between the scanning element 123 and the control element 119.

Amplifying tube 120 must, of course, be keyed in such a manner as to be operative only during the time interval that the scanning element 123 is positioned at the control element 119. This keying action of tube 120 is accomplished by applying a line synchronizing pulse or blanking signal to an auxiliary control electrode of tube 120 through a delay circuit, as illustrated.

The output control signal from tube 120 is divided between two channels, through a paraphase amplifier 121 employing a cathode follower circuit. The channel involving tube 125 derives its excitation from the anode circuit of tube 121, and the tube 127 derives its excitation from the cathode circuit of tube 121. It will be seen, therefore, that the control signal in tubes 125 and 127 is 180° out of phase with each other.

The keying of tubes 125 and 127 is accomplished by the Eccles-Jordan trigger circuit involving tubes 129 and 131, which is also controlled by the line synchronizing pulse. The Eccles-Jordan circuit containing tubes 129 and 131 causes tube 125 to be operative only during even line scanning, while tube 127 is operative only during odd line scanning. The output control signal of tubes 125 and 127 is combined and transmitted to the vertical deflection circuit of tube 115.

The image projection tubes 111 and 113 are also provided with a vertical centering control system similar to that shown for tube 115. The Eccles-Jordan circuit and the deflection signal generator circuit surrounded by the dotted line may, of course, be employed for tubes 111 and 113. It is necessary, however, that the vertical centering device including tubes 121, 125 and 127 be duplicated for each of image producing tubes 111 and 113.

It is also necessary, of course, that each of the screens of the image producing tubes 111 and 113 be provided with control elements 119.

Although in the description of the operation of this invention a horizontal scanning line has been assumed, it is not intended that the operation of this invention should be limited thereto, but that it is equally applicable to the employment of vertical scanning lines, in which case the correction would be in a horizontal direction.

Having thus described the invention, what is claimed is:

1. A television image pick-up tube target to receive a scanning raster, means to develop therefrom an image signal, a plurality of control elements each consisting of an area on said target having different response characteristics than the immediately adjoining area positioned on said target and each of said control elements having a selected edge extending directly along a portion of an even scanning line of said scanning raster and each of said control elements having a selected edge extending directly along a portion of an odd scanning line of said scanning raster, means for deriving from said image signal an electrical indication of the relative position of the point of scansion with respect to, and in a direction normal to, the selected edges of said control elements, and means connected to said means for deriving an electrical indication from said control elements to control the position of the scanning raster with respect to the selected edges of said control elements.

2. A television system comprising in combination an image pickup tube having a signal output circuit and a target electrode, said target electrode adapted to receive an interlaced scanning raster, a plurality of control elements positioned on said target electrode, said control elements each comprising an area of reduced sensitivity with respect to the remaining area of said target electrode and each control element having a selected edge centrally extending along only a portion of an even scanning line of said scanning raster, and each control element also having a selected edge extending centrally along only a portion of an odd scanning line of said scanning raster, a signal transmission channel operative only during the scanning of said odd scanning lines, a second signal channel operative only during the scanning of said even scanning lines, and means to control the position of said scanning raster connected to each of said signal channels to control the position of said raster with respect to the selected edges of said control elements.

3. A television system comprising in combination an image pickup tube having a signal output circuit and a target electrode, said target electrode adapted to receive an interlaced scanning raster, a plurality of control elements positioned in parallel on said target electrode, said control elements each comprising an area of reduced sensitivity with respect to the remaining area of said target electrode and each control element having a selected edge extending along only a portion of an even scanning line of said scanning raster, and each control element also having a selected edge extending along only a portion of an odd scanning line of said scanning raster, a signal transmission channel operative only during the scanning of a portion of said odd scanning lines, a second signal channel operative only during the scanning of a portion of said even scanning lines, and means to control the position of said scanning raster connected to each of said signal channels to control the position of said raster with respect to the selected edges of said control elements.

4. A television system comprising in combination an image pickup tube having a signal output circuit and a target electrode, said target electrode adapted to receive an interlaced scanning raster, a plurality of control elements positioned on said target electrode, said control elements each comprising an area of reduced sensitivity with respect to the remaining area of said target electrode and each control element having a selected edge extending centrally along a portion of an even scanning line of said scanning raster, and each control element also having a selected edge extending centrally along a portion of an odd scanning line of said scanning raster, a signal transmission channel operative only during the scanning of said odd scanning lines, a second signal channel operative only during the scanning of said even scanning lines, and means to control the position of said scanning raster connected to said signal channels and wherein said scanning raster is moved in one direction under the influence of signal energy from one of said signal channels and the scanning raster is moved in the other direction under the influence of signal energy from the other of said signal channels.

5. An image reproducing tube having a target screen adapted to receive an interlaced scanning raster, control element on said target screen, said control elements each having an upper and lower edge, one of said upper and lower edges extending along the center of a portion of an odd scanning line of said scanning raster and the other of said upper and lower edges extending along the center of a portion of an even scanning line of said scanning raster, a signal transmission channel operative only during said odd scanning lines and a separate signal channel operative only during said even scanning lines, the output phase of one of said transmission channels being in phase with the input signal to said transmission channel, and the output signal of the other of said transmission channels being out of phase with the signal applied to the input circuit thereof, and deflection means for said image producing tube connected to said signal channels to control the relative position of the scanning raster with respect to the selected edges of said control element.

6. In a color television system, a plurality of scanning devices for the production of scanning rasters on separate targets, means for improving mutual registration of said scanning rasters comprising a control element on each of said targets and each positioned in optical registry with the other of said control elements, each of said control elements having a selected edge extending along the position of a similar scanning line of each of said scanning rasters, circuit arrangements for deriving from said control element an electrical indication of the relative vertical position of the point of scansion with respect to the selected edges of said control elements, and means connected to said circuit arrangements to register said scanning rasters.

7. In a color television system, a plurality of image pickup tubes, each tube having a target electrode adapted to receive a scanning raster, means for improving registration of said scanning raster comprising in combination a control element on each of said target electrodes, the control elements having selected edges positioned in optical registry with each other, circuit arrangements for deriving from said control elements an electrical indication of the relative position of each point of scansion with respect to its associated selected edge of said control element, and means connected to said circuit arrangements to control the position of each scanning raster with respect to the selected edges of its associated control element.

8. A plurality of scanning devices for producing scanning rasters on separate image producing targets, means for improving registration of said scanning rasters comprising a control element for each image producing screen, each control element having a selected edge positioned in mutual optical registry and extending along only a portion of a desired scanning line of its associated scanning raster, circuit arrangements for deriving from each of said control elements an electrical indication of the relative position of the point of scansion with respect to the selected edge of each associated control element, and means connected to said circuit arrangements to control the position of the scanning rasters with respect to the selected edges of their respective control elements.

9. A scanning beam for developing a scanning raster on a target, a control area of a different magnitude of sensitivity than the area adjacent to the control area and positioned in said scanning raster and having a selected straight edge extending to correspond with substantially the center and in the direction of a scanning line of said scanning raster at the extremity only of the scanning line, means for insuring substantially uniform illumination on both sides of said edge, circuit arrangements for deriving from said control area during the scansion thereof an electrical indication of the relative position of the point of scansion with respect to the selected edge of said control area, and means connected to said circuit arrangements to control the position of the scanning raster with respect to the selected edge of said control area.

10. A target to receive a scanning raster, a control area on said target and having a selected edge extending along each scanning line of said scanning raster, circuit arrangements for deriving from the scanning of said control area an electrical indication of the overlap of the point of scansion with respect to said control area, and means connected to said circuit arrangement to center the point of scansion along the selected edge of said control area.

11. A television pick-up tube target to receive a scanning raster, means for developing a signal train therefrom, an amplifier for said signal train, a control element consisting of an area of different sensitivity than the area surrounding the element, said element positioned at said target and having a selected edge extending centrally along a portion of a scanning line of said scanning raster, circuit arrangements connected to said amplifier for deriving from said control element an electrical indication of the overlap of the point of scansion with respect to the control element, and means connected to said circuit arrangements to control the position of the scanning raster with respect to the selected edge of said control element.

12. A television image pick-up tube target to receive an interlaced scanning raster, means connected to said tube to develop a signal train representative of light valves from said scanning raster, a control element on said target and having a selected edge extending along and corresponding with only a portion of an even scanning line, said control element having another selected edge extending along and corresponding with only a portion of an odd scanning line of said scanning raster, circuit arrangements for deriving from said signal train an electrical indication of the relative position of the point of scansion with respect to the position of the selected edges of said control element, and means connected to said circuit arrangements to control the position of the scanning raster with respect to the selected edges of said control element.

13. A television pick-up tube having a target electrode, means to scan said target along a series of parallel lines to form a scanning raster, means to develop an image signal therefrom, an image signal amplifier connected to said tube, a plurality of control elements at said target and each having a selected edge corresponding to the center of a scanning line of said scanning raster, circuit arrangements connected to said image signal amplifier for deriving an electrical indication of the relative overlap of the point of scansion on said control elements, and means connected to said circuit arrangements to control the position of the scanning raster with respect to the selected edges of said control elements.

RAY D. KELL.

REFERENCES CITED

The following references are of record in the file of this patent:

UNITED STATES PATENTS

| Number | Name | Date |
|---|---|---|
| 2,227,002 | Schlesinger | Dec. 31, 1940 |
| 2,415,059 | Zworykin | Jan. 28, 1947 |
| 2,490,812 | Huffman | Dec. 13, 1949 |
| 2,530,431 | Huffman | Nov. 21, 1950 |